(12) United States Patent
Johnston (10) Patent No.: US 9,711,013 B1
(45) Date of Patent: Jul. 18, 2017

(54) AUTOMATED TELLER MACHINE FOR PROCESSING DEBIT CARD TRANSACTIONS AND METHOD THEREFOR

(71) Applicant: Jarrett Enterprises, Inc., Piscataway, NJ (US)

(72) Inventor: Eric B. Johnston, Chatham, NJ (US)

(73) Assignee: Jarrett Enterprises, Inc., Pisactaway, NJ (US)

( * ) Notice: Subject to any disclaimer, the term of this patent is extended or adjusted under 35 U.S.C. 154(b) by 0 days.

(21) Appl. No.: 15/423,322

(22) Filed: Feb. 2, 2017

(51) Int. Cl.
  *G06K 7/00* (2006.01)
  *G07F 19/00* (2006.01)
  *G06Q 20/10* (2012.01)

(52) U.S. Cl.
  CPC ....... *G07F 19/203* (2013.01); *G06Q 20/1085* (2013.01)

(58) Field of Classification Search
  USPC .................. 235/375, 379, 380; 705/5, 35–45
  See application file for complete search history.

(56) References Cited

U.S. PATENT DOCUMENTS

| 4,636,947 A | 1/1987 | Ward |
| 6,334,117 B1 | 12/2001 | Covert et al. |
| 6,420,091 B1 | 7/2002 | Nakayama et al. |
| 6,539,361 B1 | 3/2003 | Richards et al. |

(Continued)

FOREIGN PATENT DOCUMENTS

JP    2002-352302 A    12/2002

OTHER PUBLICATIONS

"The Pennsylvania Gaming Control Board Approves Over $90,000 in Casino Fines", http://gamingcontrolboard.pa.gov/?pr=604 (dated Feb. 4, 2015) (2 pages).

(Continued)

*Primary Examiner* — Matthew Mikels
(74) *Attorney, Agent, or Firm* — Greenberg Traurig, LLP (57) ABSTRACT

An automated teller machine is provided for processing a cash withdrawal request from a person having a payment card. The automated teller machine includes a microprocessor, a display connected to the microprocessor for displaying information thereon, an input device connected to the microprocessor for receiving an input from the person, and a card reader connected to the microprocessor for reading at least a card number, including a bank identifier, of the payment card presented by the person. The automated teller machine also includes a dispenser connected to the microprocessor for dispensing cash therefrom, at least one memory connected to the microprocessor for access by the microprocessor, and a plurality of bank identification numbers stored in the at least one memory. Each of the bank identification numbers is different from every other one of the bank identification numbers. The microprocessor is configured to receive the card number from the card reader, to compare the bank identifier of the card number to at least one of the plurality of bank identification numbers stored in the at least one memory, and to process the cash withdrawal request made by the person depending on whether there is a match between the bank identifier of the payment card and one of the plurality of bank identification numbers.

12 Claims, 6 Drawing Sheets

(56) References Cited

U.S. PATENT DOCUMENTS

| | | |
|---|---|---|
| 8,020,757 B2 | 9/2011 | Gardner |
| 2003/0078866 A1 | 4/2003 | Richards et al. |
| 2005/0119974 A1 | 6/2005 | Drummond et al. |
| 2005/0121513 A1 | 6/2005 | Drummond et al. |
| 2013/0151418 A1* | 6/2013 | Licciardello ........... G06Q 20/02 705/72 |

OTHER PUBLICATIONS

"The Pennsylvania Gaming Control Board Approves Over $210,000 in Casino Fines", http://gamingcontrolboard.pa.gov/?pr=597 (dated Nov. 19, 2014) (2 pages).

* cited by examiner

AUTOMATED TELLER MACHINE FOR PROCESSING DEBIT CARD TRANSACTIONS AND METHOD THEREFOR

FIELD OF THE INVENTION

The present invention relates to an automated teller machine for processing debit card transactions and a method therefor.

BACKGROUND OF THE INVENTION

Automated teller machines ("ATMs") have been provided for dispensing cash to debit card and credit card holders. A cash withdrawal made via a debit card is deducted from the balance of the holder's bank account (e.g., a checking account). Accordingly, if the holder's bank account does not have a sufficient fund to cover the desired withdrawal amount, the transaction is denied. Unlike a debit card transaction, a cash advancement made via a credit card is a loan charged to the holder's account and involves transaction costs and interests, which must be paid back to the card issuer along with the original loan amount.

Casinos have made ATMs available to their customers so that they can withdraw cash while playing in or visiting their facilities. To protect consumers, restrictions have been proposed or implemented in one or more states (e.g., Pennsylvania) restricting cash advancements to credit card holders from ATMs located at certain casino locations (e.g., on casino floors). Debit card holders are permitted to withdraw cash from ATMs in such locations without restriction. However, various fines have been levied against casinos for non-compliance.

SUMMARY OF THE INVENTION

In accordance with one embodiment, an automated teller machine for processing a cash withdrawal request from a person having a payment card includes a microprocessor, a display connected to the microprocessor for displaying information thereon, an input device connected to the microprocessor for receiving an input from the person, and a card reader connected to the microprocessor for reading at least a card number, including a bank identifier, of the payment card presented by the person. The automated teller machine also include a dispenser connected to the microprocessor for dispensing cash therefrom, at least one memory connected to the microprocessor for access by the microprocessor, and a plurality of bank identification numbers stored in the at least one memory. Each of the plurality of bank identification numbers is different from substantially every other one of the plurality of bank identification numbers. The microprocessor is configured to receive the card number from the card reader, to compare the bank identifier of the card number to at least one of the plurality of bank identification numbers stored in the at least one memory, and to process the cash withdrawal request made by the person depending on whether there is a match or no match between the bank identifier of the payment card and one of the plurality of bank identification numbers.

BRIEF DESCRIPTION OF THE DRAWINGS

In the drawing figures, which are not to scale, and where like reference numerals indicate like elements throughout the several views.

DESCRIPTION OF EMBODIMENTS OF THE INVENTION

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, and some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; exemplary embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the invention. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
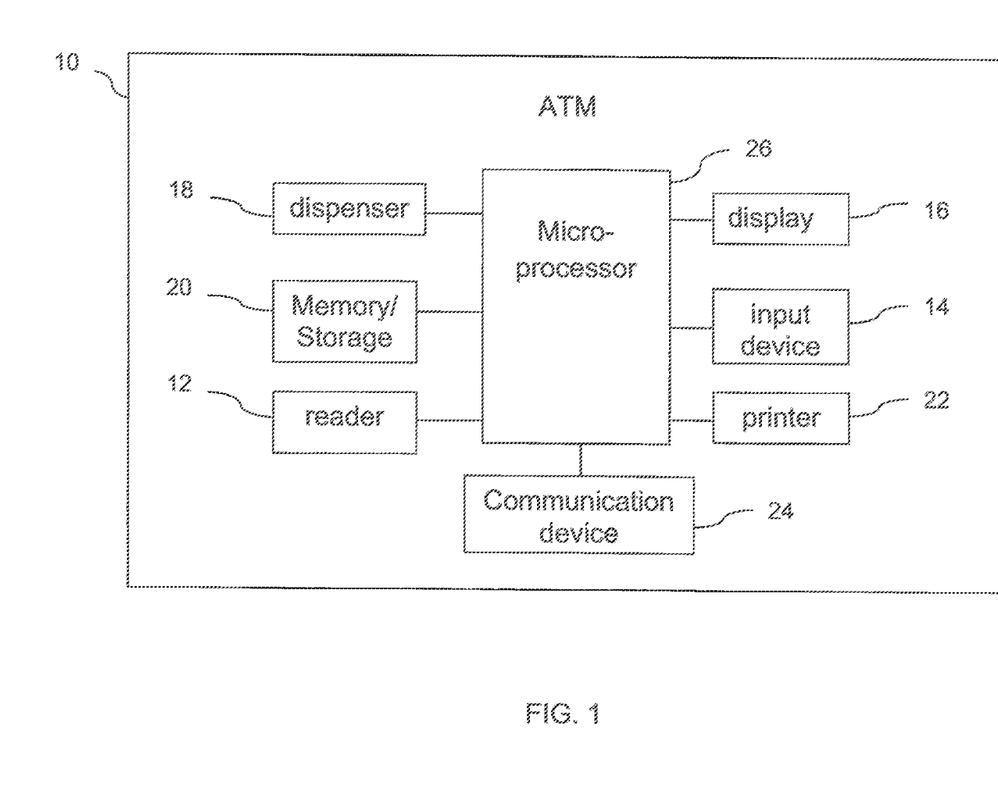
FIG. 1 is a schematic view illustrating various components of an ATM.

In one embodiment, the present invention may be used in conjunction with any existing ATMs adapted to dispense cash to holders of debit and credit cards (collectively "payment cards"). FIG. 1 illustrates various components of an exemplary ATM 10. The ATM 10 includes a card reader 12 for reading information embedded in payment cards. The card reader 12 may be any type of card reader, such as magnetic strip readers, chip (integrated circuit) readers, smart card readers and other electronic card readers.

The ATM 10 also includes an input device 14 for receiving input from card holders and a display 16 for displaying information thereon. The input device 14 and the display 16 may be any type of input device and display, respectively. In one embodiment, the input device 14 may be incorporated, in whole or in part, in the display 16 (such as a virtual keypad or keyboard incorporated in a touch screen display). In another embodiment, the input device 14 may include a unit separate and independent from the display 16 (e.g., a physical keypad).

Still referring to FIG. 1, the ATM 10 is provided with a dispenser 18 for dispensing cash from the ATM 10 and at least one internal memory or storage 20. The memory 20 of the ATM 10 may store one or more executable computer programs, as well as records and information (such as journal records, etc.) that are useful for operating the ATM 10. The ATM 10 also includes a printer 22 for printing a transaction receipt and a communication device 24, such as a modem, router, etc., for communicating with external systems. In addition, the ATM 10 has one or more microprocessors 26 operatively connected to the reader 12, the input device 14, the display 16, the dispenser 18, the communication device 24 and the printer 22 for controlling the operation of the ATM 10 and its components. Additional components of the ATM 10 are known to those skilled in the art and are not illustrated in FIG. 1 for the sake of brevity.

Figure 2:
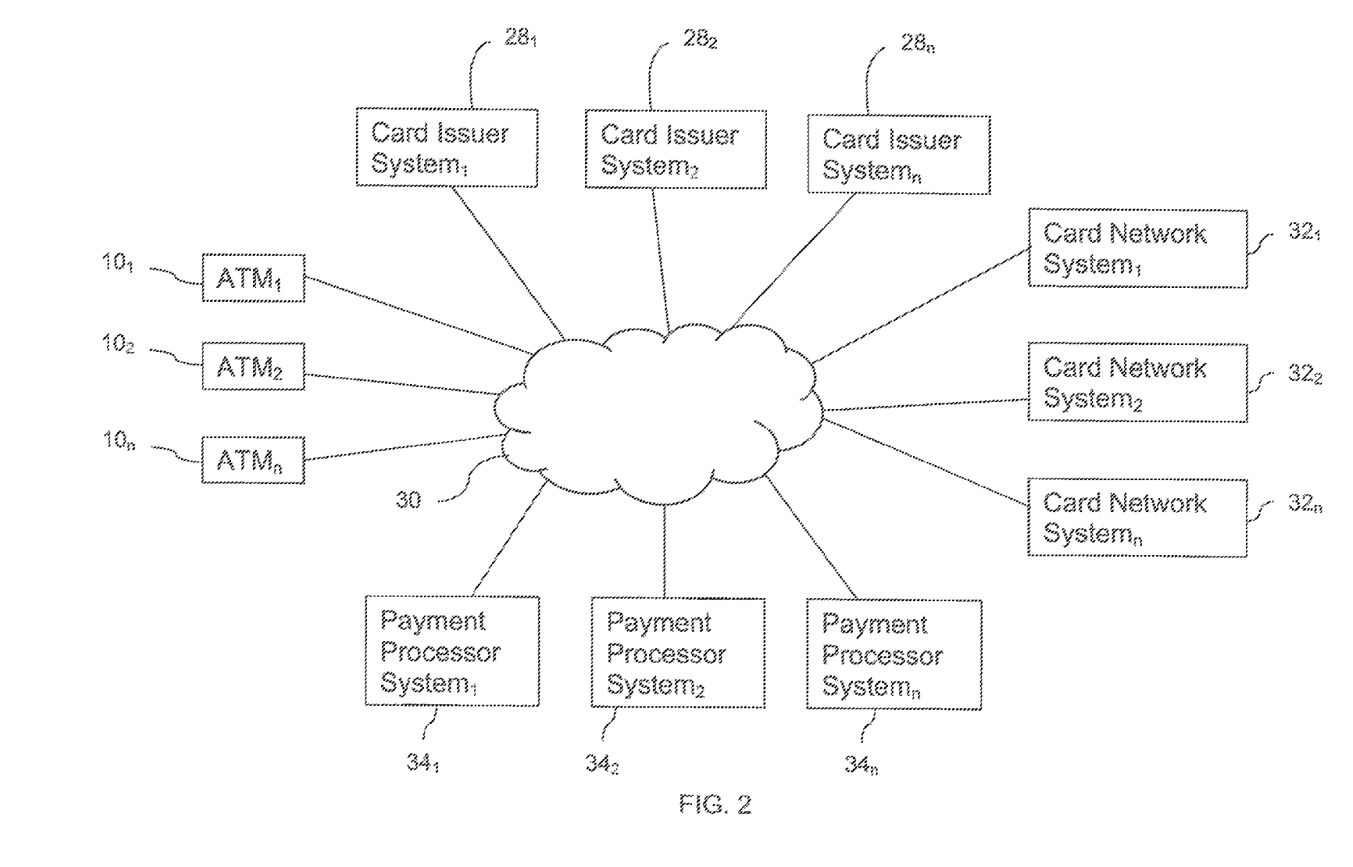
FIG. 2 is a block diagram illustrating various systems involved in processing debit card and credit card transactions requested from ATMs.

FIG. 2 illustrates an overview of various systems involved in processing debit and credit card transactions requested from ATMs $10_1$-$10_n$ and other merchant systems (such as point-of-sale payment card readers). Typically, debit and credit cards are issued by banks or other financial institutions (hereinafter the "card issuers"), such as CITIBANK, CHASE, PNC banks, etc., which are provided with computerized systems $28_1$-$28_n$, (hereinafter the "card issuer systems") connected to a communication network 30, such as wired and/or wireless telephone networks, computer or electronic networks, the Internet, etc. Debit and credit cards are usable with one or more card networks, such as the VISA, MASTERCARD and AMERICAN EXPRESS networks, for making cash withdrawals from one or more ATMs or making purchases from merchants within their corresponding card networks. The card network providers are provided with systems $32_1$-$32_n$, (hereinafter the "card network systems") connected to a communication network for communication with one or more of the card issuer systems $28_1$-$28_n$. There are also payment processors (e.g., the processors known under the names RBS WORLDPAY and COLUMBUS DATA SERVICES) for processing debit and credit card transactions. The payment processors are also provided with systems $34_1$-$34_n$ (hereinafter the "payment processor systems") which are connected to a communication network for communication with one or more of the ATMs $10_1$-$10_n$, one or more of the card issuer systems $28_1$-$28_n$, and/or one or more of the card network systems $32_1$-$32_n$.

Figure 3:
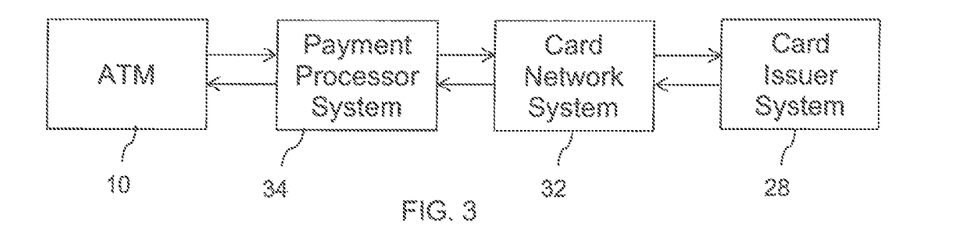
FIG. 3 is a block diagram illustrating a process involved in processing debit card and credit card transactions requested from ATMs.

Referring to FIG. 3, a cash withdrawal transaction is initiated at an ATM 10 by inserting or swiping a payment card (e.g., a debit card or a credit card) into the ATM 10. The ATM 10 collects, inter alia, the card number of the payment card and the cash amount requested from its holder, and send same to its pre-selected payment processor system 34, which in turn communicates with the card network system 32 corresponding to the payment card. The card network system 32 then communicates with the card issuer system 28, which determines whether the card holder has a sufficient balance in his/her bank account (for a debit card transaction) or whether the card holder has a sufficient credit remaining in his/her credit card account (for a credit card transaction). Approval or denial information is transmitted from the card issuer system 28 to the ATM 10 or the merchant system via the card network system 32 and the payment processor system 34.

In addition to the entities and systems illustrated in FIGS. 2 and 3, there are other entities and systems involved in the processing and completion of debit and credit card transactions. For instance, ATMs 10 are maintained or serviced by their owners' and/or service providers' systems. These other entities and systems are known to those skilled in the art and are not illustrated in FIGS. 2 and 3 for the sake of brevity. In addition, the process illustrated in FIG. 2 is a simplified overview and is described herein for illustration purposes only. Accordingly, the process may involve various additional and/or different process steps.

Figure 4:
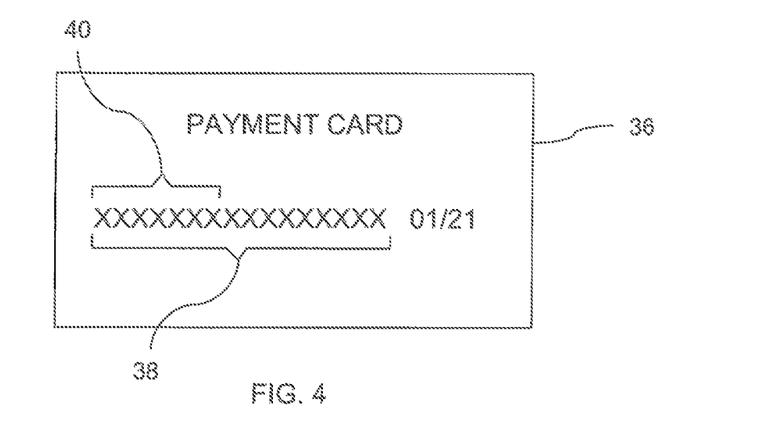
FIG. 4 is a view of an exemplary payment card.

With reference to FIG. 4, each payment card (i.e., a debit card or a credit card) 36 includes a card number 38 imprinted thereon. The card number 38 is comprised of a bank identification number 40 ("BIN", also known as "issuer identification number") and an account number (not labeled in FIG. 4). The BIN 40 is the first several (e.g., the first six or seven) digits of the card number 38 and identifies the issuing bank or financial institution of the payment card 36, while the account number, which comprises digits following the BIN 40, identifies the specific account holder or customer at the issuing bank. Each issuing bank may be assigned with a plurality of BINs, some of which are used solely for credit cards and some of which are used solely for debit cards. BINs are unique to issuing banks and the type of card for which they are used (i.e., a BIN of an issuing bank used for credit cards is not used for debit cards and vice versa).

In accordance with one embodiment, the present invention provides systems and processes for restricting cash advancement transactions requested from an ATM 10 by credit card holders. In one embodiment, existing ATMs are modified and/or configured so as to restrict such cash advancement transactions. In one embodiment, the existing hardware components of the ATM 10 are not physically modified or replaced for performing the processes of the present invention (i.e., the existing hardware components are maintained and utilized in conjunction with the present invention). In another embodiment, the existing hardware components of the ATM 10 may be modified, replaced or supplemented with one or more additional hardware components, such as one or more internal or external memory or storage devices for increasing the memory or storage capacity of the ATM 10.

Figure 5:
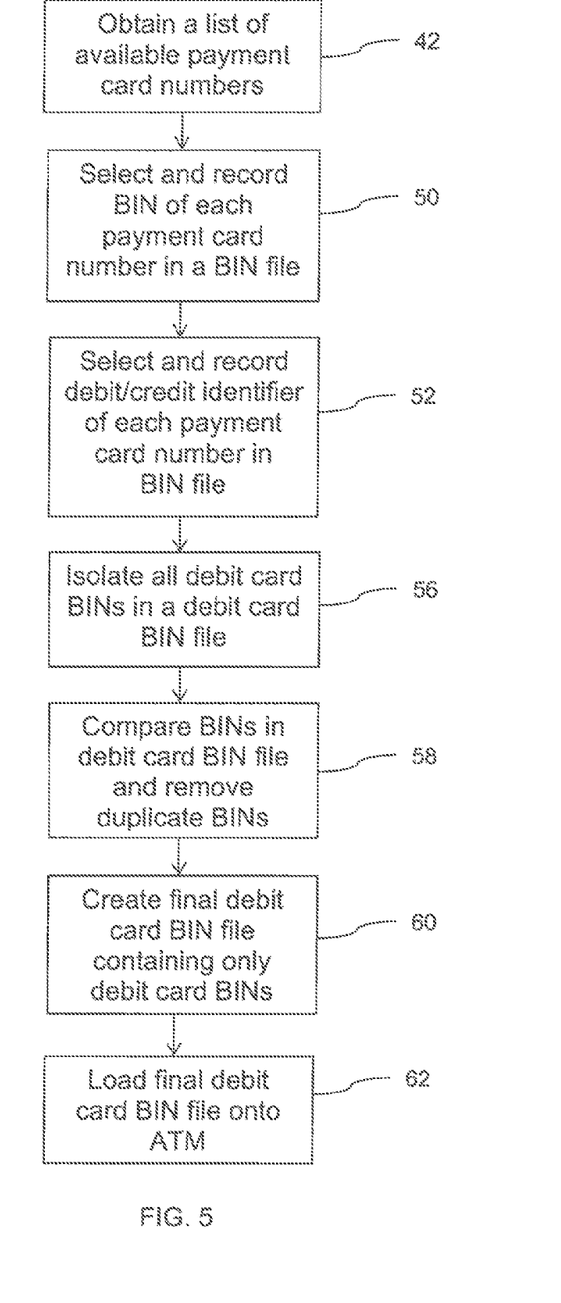
FIG. 5 is a block diagram illustrating a process for obtaining a list of available payment card numbers and processing same in accordance with an embodiment of the present invention.

Now referring to FIG. 5, in order to configure an ATM, a list of payment card numbers (i.e., card numbers of debit and credit cards) is obtained (see block 42). In one embodiment, the list of payment card numbers includes a global list of all or substantially all available, active payment card numbers that have been issued by card issuers and that are in use worldwide or in certain geographic locations (e.g., the United States, etc.). The payment card numbers are provided by their card issuers to payment processors and card network providers for processing credit card and debit card transactions. Accordingly, the systems 34, 32 of the payment processors and/or the card network providers have payment card numbers stored therein. In one embodiment, the list of payment card numbers include all or substantially all card numbers stored in and/or used by one or more of the payment processor systems 34. In one embodiment, the list of payment card numbers is generated by and/or obtained from one or more payment processor systems 34. In another embodiment, the list of payment card numbers is generated by and/or obtained from one or more card network systems 32. In yet another embodiment, the list of payment card numbers is generated by and/or obtained from one or more card issuer systems 28.

Figure 6:
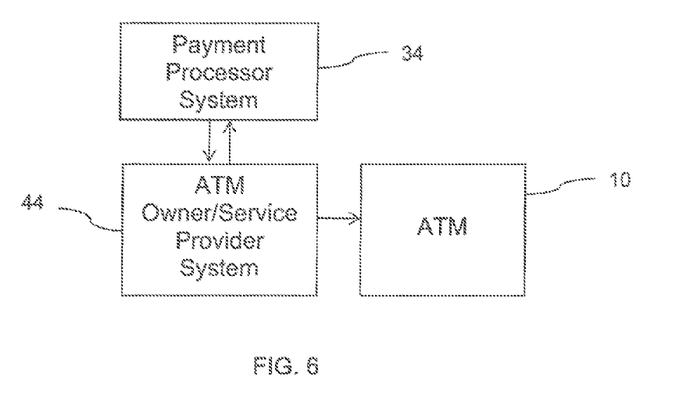
FIG. 6 is a block diagram illustrating communication between various systems during the performance of the process illustrated in FIG. 5, in accordance with an embodiment of the present invention.

In one embodiment, a communication link is established between a payment processor system 34 and an ATM owner/service system 44 to request and receive the list of payment card numbers from the payment processor system 34, as illustrated in FIG. 6. In one embodiment, the ATM owner/service system 44 is operated by an ATM owner that owns and operates ATMs or by an ATM service provider that services ATMs and performs maintenance functions thereon. In another embodiment, the ATM owner/service provider system 44 includes a system owned and operated by the ATM owner and a system owned and operated by the ATM service provider. In one embodiment, the ATM owner/service system 44 sends a request to the payment processor system 34, which in turn generates and sends a file containing the list of payment card numbers to the ATM owner/service provider system 44 via a communication link. In one embodiment, the list of payment card numbers is retrieved from the payment processor system 34 via an FTP session.

Figure 7:
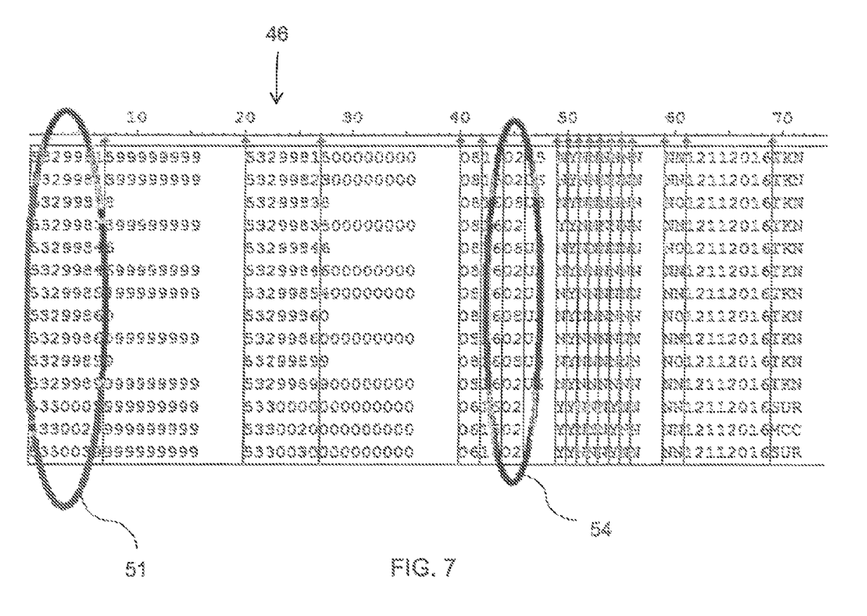
FIG. 7 is a view of a list of payment card numbers in accordance with an embodiment of the present invention.

FIG. 7 illustrates an exemplary list 46 of payment card numbers obtained from a payment processor system 34 in accordance with one embodiment of the present invention. In one embodiment, the payment card numbers are arranged in rows such that the digits of each payment card number are aligned with other payment card numbers in columns. In other embodiments, the payment card numbers may be arranged in other formats. In one embodiment, the list 46 of payment card numbers also includes identifiers for identifying whether the corresponding payment number is for a debit card or a credit card, as will be discussed in greater detail below.

In one embodiment, the BINs in the payment card numbers in the list 46 of the payment card numbers are identified and recoded in a separate BIN processing file (see block 50 in FIG. 5). In one embodiment, the first six or seven digits of each of the payment card numbers in the list 46 represent card issuers' BINs. Accordingly, the digits from position 1 through position 7 in the list 46 (see the circle designated by reference numeral 51 in FIG. 7) are selected and recorded in a BIN field of a BIN processing file. In another embodiment, the first six digits (i.e., the digits in position 1 through 6) are selected and recorded in the BIN field of the BIN processing file. In yet another embodiment, BINs may comprise more than seven digits (e.g., eight), and the number of digits selected and recorded in the BIN processing file corresponds to the largest number of digits used by card issuers for their BINs (e.g., select and record the first eight digits). In yet another embodiment, the number of digits selected and recorded in the BIN processing file corresponds to the smallest number of digits used by card issuers as their BINs (e.g., where six to seven digits are used as BINs, select and record the first six digits).

In one embodiment, the list 46 also includes debit/credit or card-type identifiers for identifying whether the corresponding payment card number is a debit card number or a credit card number. The debit/credit identifiers are selected and recorded in a BIN-type field of the BIN processing file, in which the corresponding BINs are recorded (see block 52 in FIG. 5). In one embodiment, the identifier "02" indicates that the corresponding card number is a credit card, while the identifier "08" indicates that the corresponding card number is a debit card. In one embodiment, the debit/credit identifiers appear in position 45 through position 46 in the list 46 of payment card numbers (see the circle designated by reference numeral 54 in FIG. 7). Accordingly, the digits from position 45 through position 46 are selected and recorded in the BIN-type field of the BIN processing file for each payment card record in association with its corresponding BIN. In other embodiments, the debit/credit identifiers may appear in other locations in the list 46 of payment card numbers.

The processes discussed above for selecting and recording the BINs and debit/credit identifiers are performed for each payment card record in the list 46 of payment card numbers (e.g., for each row in the list 46 shown in FIG. 7). In one embodiment, the BIN and the debit/credit identifier for each payment card record are selected and recorded in the corresponding fields of the BIN processing file substantially simultaneously. In another embodiment, the BIN and the debit/credit identifier for each payment card record are selected and recorded in the corresponding fields of the BIN processing file sequentially. In other embodiments, the BINs of the payment card records are selected and recorded in the BIN processing file, and the debit/credit identifiers of the payment card records are then recorded in the BIN processing file and associated with their corresponding BINs.

After all of the BINs and debit/credit identifiers have been recorded in the BIN processing file, the BINs in the BIN processing file are sorted and/or isolated based on their card types (i.e., debit or credit). In one embodiment, the BINs in the BIN processing file designated as debit cards are isolated and recorded in a separate debit card BIN processing file (see block 56 in FIG. 5). That is, the records from the BIN field in the BIN processing file are extracted and recorded in the debit card BIN processing file if their corresponding debit/credit identifiers are a debit card identifier (i.e., the data equals "08"). In another embodiment, the BINs in the BIN processing file designated as credit cards are removed or deleted from the BIN processing file to form a debit card BIN processing file, which contain BINs for debit cards only ("debit card BINs"). That is, BINs are deleted from the BIN processing file if their corresponding debit/credit identifiers are a credit card identifier (i.e., the data equals "02"). The resulting debit card BIN processing file includes only debit card BINs and does not contain BINs used for credit cards (i.e., "credit card BINs").

The inventor has discovered that debit card BIN file resulting from the processes discussed above may be too large to be uploaded onto the memory/storage of an existing ATM. The inventor has also discovered that the large size of the debit card BIN file is due, at least in part, to a large number of duplicate BINs in the resulting file because they have been carried over from the original list 46, which includes all or substantially all available payment card numbers. It was further discovered that the size of the debit card BIN file can be reduced significantly by removing such duplicates therefrom, such that the debit card BIN file after removing all or substantially all duplicates are small enough to be uploaded onto the memory/storage of an existing ATM (e.g., the number of BINs in the file is reduced by about 60%-about 65% by removing such duplicates). Accordingly, in one embodiment, after the debit card BIN processing file has been completed at block 56 in FIG. 5, it is further processed so as to remove duplicate debit card BINs therefrom (see block 58). In one embodiment, the duplicate removing process is performed by comparing each BIN in the debit card BIN processing file to the rest of the BINs and removing or deleting each duplicate BIN when one is encountered. In another embodiment, the BINs in the debit card BIN processing file are sorted, and duplicates are removed. In one embodiment, the number of BINs is reduced from about 97,000-about 98,000 to about 36,000-about 37,000. In this manner, a BIN file ("final debit card BIN file") resulting from the BIN removing process does not contain any duplicate debit card BINs. That is, each of the debit card BINs in the final debit card BIN file is different from every other one of the debit card BINs. In some embodiments, a small number of duplicates (e.g., less than 5% of the total duplicate BINs) may remain in the final debit card BIN file. In one embodiment, the final debit card BIN file contains about 36,000-about 37,000 BINs. In another embodiment, the final debit card BIN file contains at least 30,000 BINs.

After the final debit card BIN file has been completed (see block 60 in FIG. 5), it is uploaded and stored in the memory or storage of an ATM 10 via a communication network (see block 62 in FIG. 5). In one embodiment, the final debit card BIN file is converted into a format suitable for storage in, and use by, the ATM 10. In another embodiment, the final debit card BIN file is divided into smaller sub-files, which are uploaded into different locations of the memory or storage of the ATM 10. In yet another embodiment, the sub-files may be uploaded into different internal memory devices, if the ATM 10 is equipped with same. In a further embodiment, the final debit card BIN file and/or its sub-files may be compressed (e.g., into one or more ZIP files) and stored in the ATM memory or storage in a compressed format. Any suitable compression or decompression method may be utilized.

In one embodiment, information stored in the memory or storage of the ATM 10 is deleted for increasing the available memory/storage space of the ATM 10. In one embodiment, the information deleted includes journal records, which include information relating to transactions performed by card holders at the ATM 10, such as the transaction dates, the amount of cash dispensed, and other relevant information.

Referring back to FIG. 6, the final debit card BIN file is uploaded to the ATM 10 from the ATM owner/service provider system 44 via a communication link in accordance with one embodiment of the present invention. In one embodiment, the final debit card BIN file is prepared and/or completed by the ATM owner system and then sent to the ATM service provider system for uploading onto the ATM memory/storage. In another embodiment, the final debit card BIN file is prepared and/or completed by the ATM owner system and then uploaded onto the ATM memory/storage. In another embodiment, the final debit card BIN file is prepared and/or completed by the ATM service provider system and then uploaded onto the ATM memory/storage.

After the uploading of the final debit card BIN file, the memory/storage of the ATM 10 contains no credit card BINs, but only debit card BINs, none of which has a duplicate, in accordance with one embodiment. In one embodiment, the number of debit card BINs uploaded to the ATM memory/storage is at least 30,000. In another embodiment, the number of debit card BINs uploaded to the ATM memory/storage ranges from about 35,000 to about 40,000. In another embodiment, the number of debit card BINs uploaded to the ATM memory/storage ranges from about 36,000 to about 37,000. In other embodiments, the number of debit card BINs uploaded to the ATM memory/storage ranges is more than 40,000 or less than 35,000 or 30,000. In some embodiments, the ATM memory/storage may contain a small number of credit card BINs.

Figure 8:
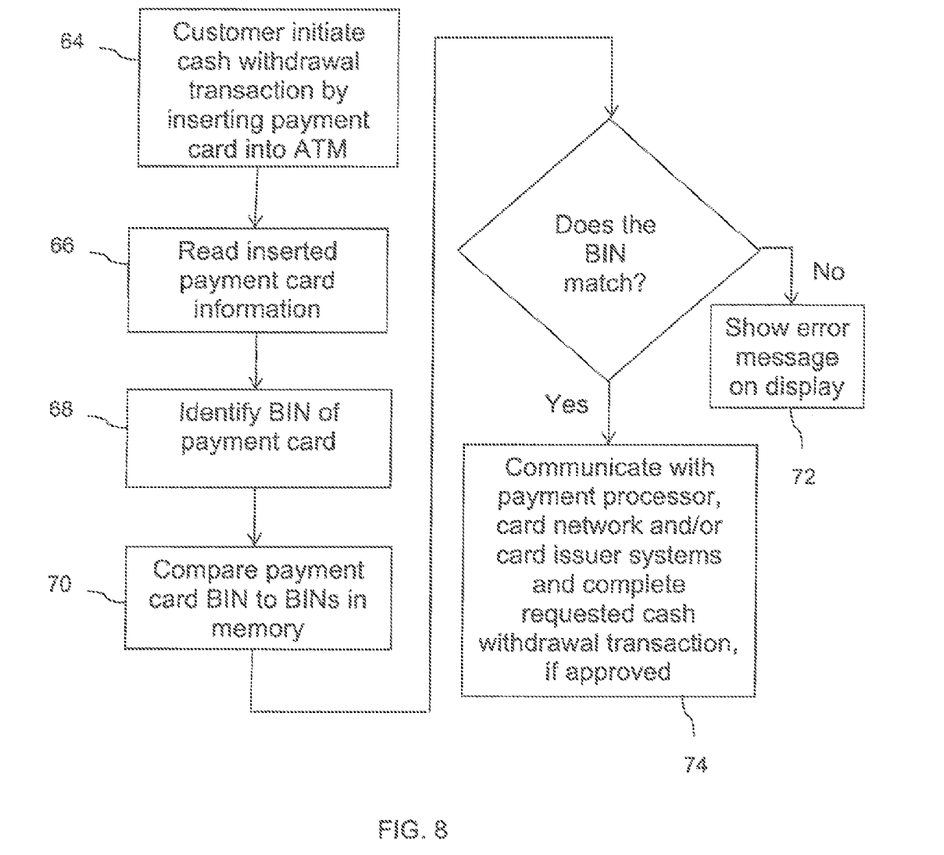
FIG. 8 is a block diagram illustrating a process for processing debit and credit card cash withdrawal requests from an ATM in accordance with an embodiment of the present invention.

FIG. 8 schematically illustrates a process for processing and completing cash withdrawal transactions requested from payment card holders at the ATM 10 in accordance with an embodiment of the present invention. In one embodiment, the process disallows transaction requests made by credit card holders, while allowing those from debit card holders if approved by their card issuers. To initiate a cash withdrawal/advancement request, a payment card holder inserts or swipes his/her payment card into or on the card reader 12 of the ATM 10 (see block 64) and inputs a PIN on the input device 14 of the ATM 10. In response, the account information of the payment card is retrieved and transmitted to the microprocessor 26 of the ATM 10 (see block 66). The BIN of the payment card (e.g., the first six or seven digits of the card number read by the card reader 12, or the number of digits corresponding to the number of digits selected in the BIN collecting process discussed above in connection with block 50 in FIG. 5) is identified by the microprocessor 26 (see block 68) and then compared to the list of debit card BINs stored in the memory/storage 20 of the ATM 10 (see block 68). If there is no match, the requested transaction is disallowed and an error message is displayed on the display 16 of the ATM 10 (see block 72). In one embodiment, the error message indicates that the ATM 10 dispenses cash to debit card holders only. In the event that the BIN of the payment card matches to one of the BINs stored in the memory/storage 20 of the ATM 10, the requested transaction proceeds as discussed above in connection with FIG. 3 and is completed (i.e., the request cash is dispensed) if there is a sufficient fund in the holder's associated bank account and other criteria are satisfied (see block 74).

In one embodiment, programmable instructions executable by the microprocessor 26 of the ATM 10 are modified to perform the process illustrated in FIG. 8. Such modifications may be performed by uploading software updates to the ATM 10 from the ATM owner/service provider system 44 and/or activating functions that may already exist, but not activated, in the ATM 10.

In accordance with one embodiment, a BIN file containing only credit card BINs ("credit card BIN file") is formed and uploaded onto the ATM 10, rather than uploading the final debit card BIN file. The credit card BIN file may be prepared using the processes discussed above in connection with the final debit card BIN file, except that credit card BINs are segregated and placed in a credit card BIN processing file and duplicate credit card BINs are removed therefrom. Accordingly, the resulting credit card BIN file does not contain any debit card BINs or duplicates of any credit card BINs. In one embodiment, the number of credit card BINs in the credit card BIN file ranges from about 186,000 to about 187,000 before removing duplicates therefrom. In one embodiment, the number of credit card BINs remaining after removing all or substantially all duplicates ranges from about 100,000 to about 110,000. In other embodiments, the total number of credit card BINs in the credit card BIN file is reduced by about 40%-about 50% or by about 40%-about 45% by removing all or substantially all duplicates therefrom. In one embodiment, the total number of credit card BINs that may be stored in an ATM ranges from about 100,000 to about 110,000. In other embodiments, the number of credit card BINs that may be stored in an ATM may be less than about 100,000 or greater than about 110,000. In one embodiment, the process illustrated in FIG. 8 is modified such that the ATM 10 compares the payment card number read by its card reader 12 to the credit card BINs stored in the memory 20 and denies the requested cash withdrawal transaction if there is a match. In other words, the requested cash withdrawal transaction proceeds only if there is no match between the payment card and the stored credit card BINs.

In one embodiment, debit cards include bank cards issued by banks and other financial institutions for allowing customers to withdraw money from their accounts at an ATM. In another embodiment, debit cards also include gift cards and other pre-paid cards with pre-paid account balances that may be deducted when making purchases and/or withdrawing money from an ATM.

Those skilled in the art will recognize that the methods and systems of the present invention may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the invention covers conventionally known manners for carrying out the described features and functions and interfaces, as well as those variations and modifications that may be made to the hardware or software or firmware components described herein as would be understood by those skilled in the art now and hereafter.

While the systems and methods have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

I claim:

1. An automated teller machine for processing a cash withdrawal request from a person having a payment card, said automated teller machine comprising a microprocessor; a display connected to said microprocessor for displaying information thereon; an input device connected to said microprocessor for receiving an input from the person; a card reader connected to said microprocessor for reading at least a card number, including a bank identifier, of the payment card presented by the person; a dispenser connected to said microprocessor for dispensing cash therefrom; at least one local memory connected to said microprocessor for access by said microprocessor; and a plurality of bank identification numbers stored in said at least one local memory, said microprocessor being configured to receive the card number from said card reader, to compare the bank identifier of the card number to at least one of said plurality of bank identification numbers stored in said at least one local memory, and to process the cash withdrawal request made by the person depending on whether there is a match between the bank identifier of the payment card and one of said plurality of bank identification numbers.

2. The automated teller machine of claim 1, wherein said plurality of bank identification numbers do not contain any duplicate of any of the bank identification numbers in said plurality of bank identification numbers.

3. The automated teller machine of claim 2, wherein all of said plurality of bank identification numbers are credit card bank identification numbers or debit card bank identification numbers.

4. The automated teller machine of claim 3, wherein said plurality of bank identification numbers include only debit card bank identification numbers.

5. The automated teller machine of claim 4, wherein said microprocessor is configured to decline the cash withdrawal request if there is no match between the bank identifier of the payment card and one of said plurality of bank identification numbers.

6. The automated teller machine of claim 5, wherein said microprocessor is configured to dispense cash from said dispenser if there is a match between the bank identifier of the payment card and one of said plurality of bank identification numbers and if said microprocessor receives an approval for the cash withdrawal request from a payment processor system.

7. The automated teller machine of claim 3, wherein said plurality of bank identification numbers include only credit card bank identification numbers.

8. The automated teller machine of claim 7, wherein said microprocessor is configured to decline the cash withdrawal request if there is a match between the bank identifier of the payment card and one of said plurality of bank identification numbers.

9. The automated teller machine of claim 8, wherein said microprocessor is configured to dispense cash from said dispenser if there is no match between the bank identifier of the payment card and one of said plurality of bank identification numbers and if said microprocessor receives an approval for the cash withdrawal request from a payment processor system.

10. The automated teller machine of claim 1, wherein the number of said plurality of bank identification numbers stored in said at least one local memory is at least 30,000.

11. The automated teller machine of claim 1, wherein each of said plurality of bank identification numbers is different from substantially every other one of said plurality of bank identification numbers.

12. The automated teller machine of claim 1, wherein said at least one local memory is located within said automated teller machine.

* * * * *